US00RE40896E

(19) United States
(12) Reissued Patent
Turina et al.

(10) Patent Number: US RE40,896 E
(45) Date of Reissued Patent: Sep. 1, 2009

(54) METHOD AND ARRANGEMENT IN A RADIO COMMUNICATION SYSTEM

(75) Inventors: Dalibor Turina, Taby (SE); Lars Billström, Solna (SE)

(73) Assignee: Telefonaktiebolaget L M Ericsson (Publ), Stockholm (SE)

(21) Appl. No.: 10/208,767

(22) PCT Filed: Mar. 7, 1996

(86) PCT No.: PCT/SE96/00299

§ 371 (c)(1),
(2), (4) Date: Apr. 28, 1998

(87) PCT Pub. No.: WO96/31077

PCT Pub. Date: Oct. 3, 1996

Related U.S. Patent Documents

Reissue of:
(64) Patent No.: 6,097,717
Issued: Aug. 1, 2000
Appl. No.: 08/930,039
Filed: Mar. 7, 1996

(30) Foreign Application Priority Data

Mar. 31, 1995 (SE) ..... 9501177

(51) Int. Cl.
*H04B 7/212* (2006.01)

(52) U.S. Cl. ..... 370/348; 370/443

(58) Field of Classification Search ..... 370/442, 370/337, 341, 431, 348, 443, 328, 329, 336; 455/517, 450, 452
See application file for complete search history.

(56) References Cited

U.S. PATENT DOCUMENTS

| | | | | | |
|---|---|---|---|---|---|
| 4,012,597 | A | | 3/1977 | Lynk, Jr. et al. | |
| 4,736,371 | A | * | 4/1988 | Tejima et al. | |
| RE32,789 | E | | 11/1988 | Lynk, Jr. et al. | |
| 4,907,224 | A | | 3/1990 | Scoles et al. | |
| 4,977,589 | A | | 12/1990 | Johnson et al. | |
| 5,166,929 | A | | 11/1992 | Lo | |
| 5,278,833 | A | * | 1/1994 | Crisler et al. | 370/348 |
| 5,295,140 | A | * | 3/1994 | Crisler et al. | 370/443 |
| 5,297,144 | A | * | 3/1994 | Gilbert et al. | |
| 5,327,432 | A | * | 7/1994 | Zein Al Abedeen et al. | 370/348 |
| 5,481,537 | A | * | 1/1996 | Crisler et al. | |
| 5,515,379 | A | | 5/1996 | Crisler et al. | |
| 5,594,738 | A | | 1/1997 | Crisler et al. | |
| 5,633,911 | A | * | 5/1997 | Han et al. | 379/58 |
| 5,677,909 | A | * | 10/1997 | Heide | 370/347 |
| 5,784,362 | A | * | 7/1998 | Turina | 370/321 |
| 5,790,525 | A | | 8/1998 | Kou et al. | |
| 6,097,707 | A | * | 8/2000 | Hodzic et al. | 370/321 |

FOREIGN PATENT DOCUMENTS

| | | |
|---|---|---|
| EP | 0 491 494 | 6/1992 |
| GB | 2 281 470 | 3/1995 |
| JP | 5-091009 | 4/1993 |
| WO | WO 93/03583 | 2/1993 |
| WO | WO 94/10767 | 5/1994 |

OTHER PUBLICATIONS

"Medium Access Priority," Motorola, Edinburgh, Mar. 1995, pp. 1–3.
* cited by examiner

*Primary Examiner*—Alpus H. Hsu

(57) ABSTRACT

The present invention concerns a process in a radio communication system which is arranged for packet data transmission according to a message-synchronized ALOHA protocol with reservation. Mobile stations in the system are arranged to send access requests to a base station during a reservation phase in a mobile radio system which uses this protocol. The base station is arranged to receive and comply with the access request from a first mobile station by sending thereto a channel reservation message (2) comprising a channel reservation (3). The base station is further arranged to receive access requests from at least a second mobile station for which channel reservation momentarily cannot be carried out. According to the process of the invention an access request received from the second mobile station is confirmed when channel reservation cannot be carried out in the usual manner. The confirmation is sent in the form of an access confirmation (4, 5) which is included in the same channel reservation message (2) as the channel reservation (3) for the first mobile station.

15 Claims, 2 Drawing Sheets

METHOD AND ARRANGEMENT IN A RADIO COMMUNICATION SYSTEM

Matter enclosed in heavy brackets [ ] appears in the original patent but forms no part of this reissue specification; matter printed in italics indicates the additions made by reissue.

*This application claims priority from Sweden Application No. 9501177, filed 31 Mar. 1995, and from PCT International Application No. PCT/SE96/00299, filed on 7 Mar. 1996 (and published in the English language on 3 Oct. 1996 as International Publication Number WO 96/31077), PCT International Application No. PCT/SE96/00299 claims priority from Sweden Application No. 9501177.*

TECHNICAL BACKGROUND

The present invention concerns a process for a radio communication system which is arranged for packet data transmission according to a message-synchronized ALOHA protocol with reservation. The invention concerns a process for requesting access in a momentarily overloaded mobile radio system wherein an access request received in a base station from each station in a first group of mobile stations cannot be responded to by channel reservation for the first group of mobile stations.

The invention also concerns a base station and a mobile station in a radio communication system for packet data transmission.

PRIOR ART

In the case of mobile radio communication systems for packet data transmission a base station can communicate with a plurality of mobile stations via one or a plurality of time-divided channels between the base station and the mobile stations. A time-divided channel is divided into time slots. A data burst with a number of information bits can be transmitted in each time slot. The mobile stations do not communicate continuously with the base station and a plurality of mobile stations can therefore compete for the same time-divided channel. Channels are allocated dynamically, separately from the channel requirement of the mobile stations and channel allocation is controlled by the base station.

A mobile station announces a channel requirement by sending an access request to the base station. This access request is sent in a reservation phase in the time-divided channel for transmission from the mobile stations to the base station. Different types of protocol can be used in order to control the access request and channel allocation. A conventional protocol in the case of dynamic allocation of time-divided radio channels is a message-synchronized ALOHA protocol with reservation. In the case of this protocol, each packet transmission is preceded by a reservation. A short message with a request for channel reservation is sent at random from a mobile station to a base station. According to the ALOHA reservation protocol, the result of this access request is fed back by the base station giving the mobile station access to at least part of the time-divided channel.

Since many mobile stations may have a need of packet data transmission, collisions can occur as a result of a number of mobile stations sending access requests simultaneously. This means that, of the messages sent simultaneously, in the best case the base station can accept one message (by using the so-called "capture" effect). In the case of a collision, the sending mobile stations which do not receive channel reservation have to repeat their access requests. In order to reduce the risk of a further collision, the repeated transmission occurs after a given time interval which varies for each mobile station. It is well known that this time interval can vary randomly for each mobile station.

When all the free channel capacity in a radio communication system has been reserved for communication, overloading occurs if a further mobile station sends an access request to the base station. The latter receives the access request in itself from the mobile station but cannot comply with this request within a given predetermined time interval since there is no free channel capacity. The mobile station is then forced to repeat the access request in the same way as in the case of a collision, when the predetermined time interval has elapsed. This naturally leads to unnecessary extra channel loading, unnecessary delays in the mobile system and the risk of collisions occurring when transmissions are repeated.

U.S. Pat. No. 5,166,929, for example, earlier disclosed a multiple-access protocol, in the case of which feedback concerning the status of an access channel is provided from the base station to the mobile stations. The mobile stations can thereby receive information concerning the result of an access request, for example, that a collision has occurred, and whether the next time slot is open for the sending of new access requests. This information makes it easier to determine when a new access request should be sent. A disadvantage of this protocol is that an overload situation is unmanageable. An access request received in the base station has to be repeated in a situation in which channels temporarily cannot be allocated in the base station owing to overloading, i.e. no channels are free.

A paper entitled "Medium Access Priority" by Motorola and presented at the standardizing meeting within ETSI STC SMG2 in Edinburg on Mar. 7, 1995 discusses a possible need of acceptance confirmation in the case of access requests from a mobile station to a base station. According to this paper, the mobile station is thus to be informed whether the access request has been correctly accepted in the base station. However, it is not mentioned as to how this confirmation of the access request is to be carried out.

DESCRIPTION OF THE INVENTION

The object of the present invention is to propose a process in a radio communication system for packet data transmission. The invention achieves this object by managing the access request from each station in a first group of mobile stations to a base station in a momentarily overloaded radio communication system which lacks free channel capacity for data transmission.

The object is achieved by the use of a message-synchronized ALOHA protocol with reservation. Packet data transmission is carried out via one or a plurality of time-divided channels between a base station and mobile stations. The mobile stations are arranged so as to send the access request to the base station during a reservation phase in a mobile radio system which uses this protocol. The base station is arranged so as to accept and comply with the access request from a first mobile station by sending thereto a channel reservation message comprising a channel reservation. As a result of this channel reservation, time slots for packet data transmission from the first mobile station to the base station are reserved. The base station is further arranged to accept access requests from a first group of mobile stations for which channel reservation momentarily cannot be carried out. In accordance with the process according to the invention, receipt of the access request from the first group of mobile stations is confirmed when the channel reservation cannot be carried out in the usual manner. Confirmation is sent in the form of access confirmations which are included in the same channel reservation message as said channel reservation for the first mobile station. The channel reservation message is received by each of the mobile stations in the first group. The mobile stations are actuated so that they await channel reservation without making repeated access requests. In connection with the access confirmations, a queue of the mobile stations in the first group is arranged in the mobile radio system. Channel reservation for the mobile stations in the first group is carried out according to their position in this queue.

The invention also concerns a base station and a mobile station in a radio communication system for packet data transmission. The base station and mobile station according to the invention are arranged to implement the process according to the invention.

By means of the process according to the invention the load on an access channel to the base station can be decreased since the number of times which an access request is repeated in the system is reduced. This naturally reduces the average delay in transmission of data between a mobile station and a base station. Furthermore a shorter time interval can be predetermined before the access request is initialized again, which means shorter average access delay.

PREFERRED EMBODIMENT

Figure 1:
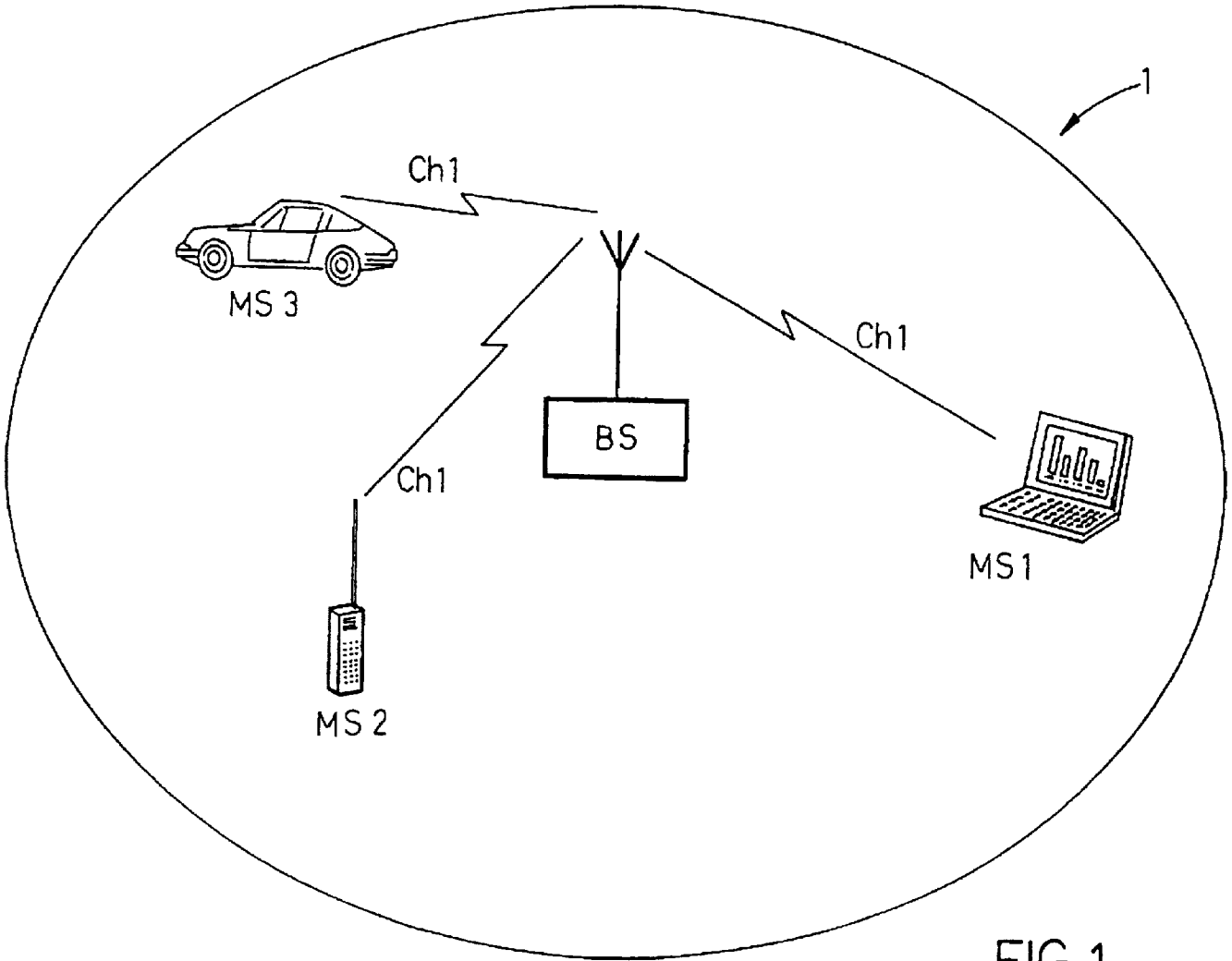
FIG. 1 shows a mobile radio system with mobile stations and a base station.

In the following the invention will be explained in greater detail with reference to the drawings, in which FIG. 1 shows a cell 1 in a mobile radio communication system with mobile stations MS1–MS3 and a base station BS, for example a GSM system for communication via time-multiplex channels (TDMA).

In the preferred embodiment a single communication channel Ch1 adapted for packet data transmission is used. This means that both data packets and associated control signals are transmitted via the same channel.

A mobile station MS1 initiates packet data transmission by sending an access request to a base station BS via a data packet channel. This access request comprises identification of the transmitting mobile station, for example in the form of a random figure, possibly together with information about the desired class of service (for example, priority). The access request is dispatched randomly in order to reduce the risk of access requests from a plurality of mobile stations being sent simultaneously, but the request has to be sent within a given time interval which is reserved for this type of transmission. This time interval can, for example, consist of a time slot in a number of periodically recurring time frames. When the access request has been received and if channel capacity is available for this packet data transmission, the base station BS sends a channel reservation message 2 to the mobile station MS 1. This channel reservation message includes a channel reservation whereby time slots for transmitting from the mobile station to the base station are allocated. The channel reservation further includes a reference to the access request which is accepted. The reference includes the same information which was received in the access request and a reference to the time frame or time slot in the time-divided channel Ch1 in which the access request was received. A mobile station MS1 thereby receives information as to whether the channel reservation is intended for this very mobile station. The mobile station MS1, from which the access request originates, thereby receives information that it has been allocated time slots for packet data transmission.

During the time in which the mobile station MS1 carries out packet data transmission on the reserved channel, it is important that the other mobile stations MS2, MS3 do not attempt to initiate transmission on the channel. Access requests from the mobile stations are therefore only permissible when the base station BS reports that one or a plurality of time slots are free for this purpose. The base station indicates that it is possible to send access requests by placing a flag on the channel to the mobile stations MS1–MS3. When packet data transmission in the allocated time slots has terminated, the base station indicates that a number of time slots in the channel from the mobile stations to the base station are again open for access requests. Access requests can again be sent randomly to the base station.

During the time slots which are free between the transmission of different data packets from mobile stations to the base station, i.e. open for access requests, a plurality of mobile stations MS1–MS3 can send an access request to the base stations BS. If transmission occurs at the same time for some of the mobile stations MS1–MS3, a collision occurs between the transmissions. In this collision situation, the base station BS is unable to interpret the message from more than at most one of the stations in question and the transmission of the access request therefore has to be repeated.

Figure 2:
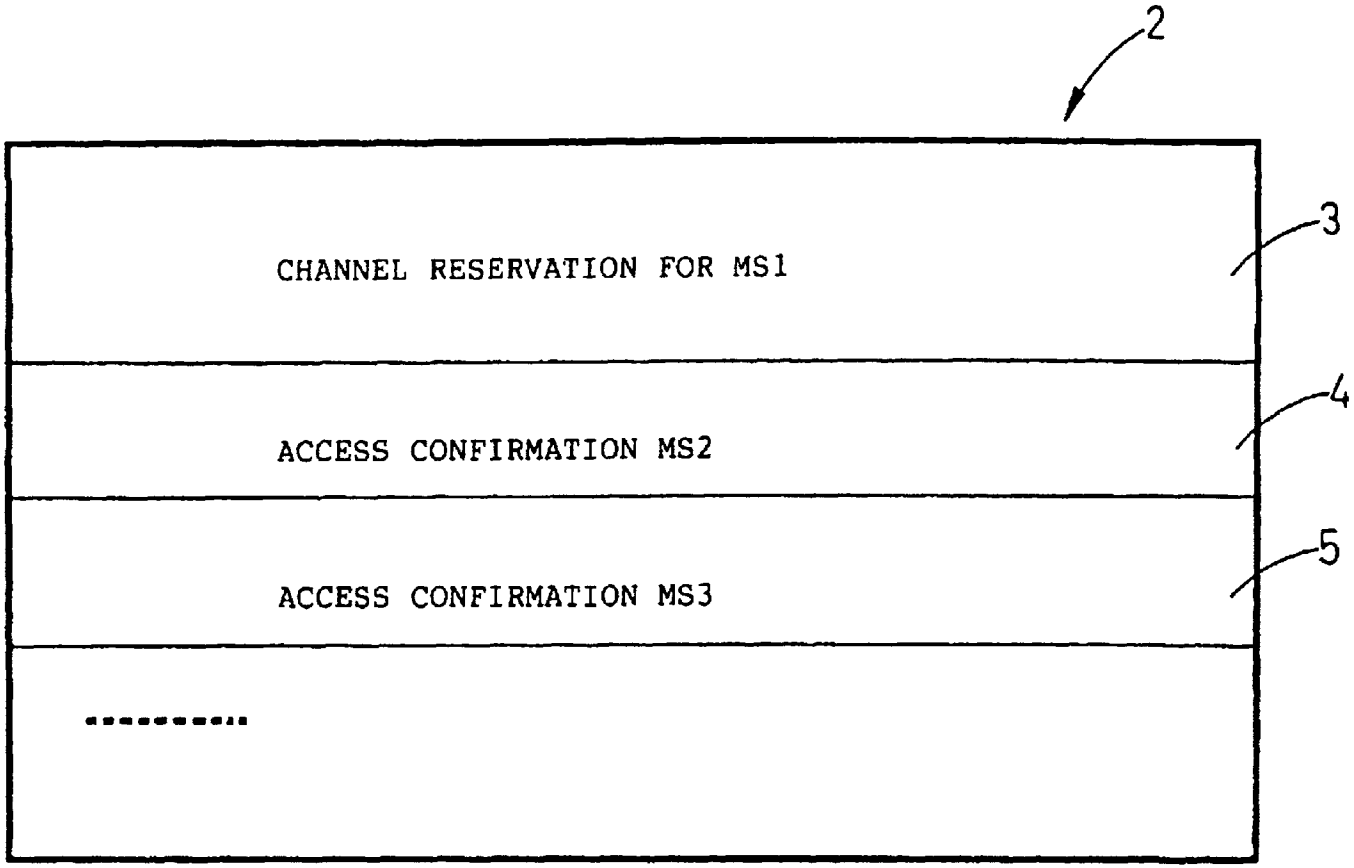
FIG. 2 shows a channel reservation message from a base station to mobile stations.

If a plurality of mobile stations MS1–MS3 send access requests without overlapping to a base station, the channel reservation can only be carried out for one or more of these stations. When a channel reservation is carried out for a first mobile station MS1, the other mobile stations MS2, MS3 have to await free channel capacity in spite of the fact that the access requests from these stations have been received correctly in the base station BS. In re-transmission situations access requests can also be received randomly between different transmissions included in a sequence relating to the same data packet. This depends on whether it is desired to use the gaps in such a sequence so that access requests can be received. According to the invention, in order to prevent a new wave of access enquiries from these mobile stations MS2, MS3, each access request correctly received in the base station (up to a given limit) is usually responded to. Access confirmation 4, 5 are accordingly sent to at least a number of the stations MS2, MS3 which do not immediately have a channel reservation 3 accepted. These access confirmations are included in a channel reservation message 2 comprising a channel reservation 3 to the mobile station MS1 which is allocated a channel in response to the access request. Such a channel reservation message 2 is shown in FIG. 2. Since this channel reservation 3 is sent in a message 2 in a format which is common to all the control messages, for example comprising four time slots, and since given control data can be used together, a limited number of access confirmations 4, 5, can be included in the same message 2.

These access confirmations consequently do not give rise to increased channel loading.

The confirmation of correctly received access requests from a number of mobile stations enables a queue of mobile stations awaiting their turn for packet data transmission to be arranged in the mobile radio system.

When packet data transmission is used in the GSM system a limited number of access confirmations can be included in a message with channel reservation. As concerns the reference to the time frame when the enquiry from a mobile station was received, this access confirmation is carried out in two ways. The first way is to indicate the number of the time frame (related to a given multiframe structure which is used in the system), in the same way as in the channel reservation 3, in part of the channel reservation message 2. The other way is, instead, to use a reference relating to the time frame which is given in the usual channel reservation message.

It will be appreciated that the invention is not restricted to the above-described embodiment but encompasses any embodiment which lies within the scope of protection of the following claims.

What is claimed is:

1. In a radio communication system which is arranged for packet data transmission via at least one time-divided channel between a base station and mobile stations, according to a message-synchronized ALOHA protocol with reservation, the mobile stations being arranged to send access requests to the base station, which is arranged to receive and comply with access requests from at least a first mobile station by sending thereto a channel reservation message comprising a channel reservation, whereby time slots are reserved for packet data transmission between the first mobile station and the base station, and to receive access requests from a first group of mobile stations for which channel reservation momentarily cannot be carried out, a method comprising the steps of:

confirming the reception of access requests from the first group of mobile stations in the form of an access confirmation from the base station to each of the mobile stations included in the first group;

including the access confirmations in the channel reservation message with the channel reservation to the first mobile station;

arranging the first group in the radio communication system associated with the access confirmations in a queue, a queue position being allocated to each of the mobile stations in this group; and carrying out channel reservation for the mobile stations according to their queue positions.

2. A method according to claim 1, further comprising the steps of:

reading the channel reservation message by all the mobile stations from which access requests are received in the base station; and including access confirmations in the channel reservation message received in the mobile stations, whereby the latter are actuated so as to await channel reservation without making repeated access requests.

3. A method according to claim 1, further comprising the steps of:

supplying a first reference in the channel reservation to the first mobile station, which first reference refers to a first time slot in the time-divided channel, in which first time slot the access request from the first mobile station was received in the base station; and supplying a second reference in each access confirmation, which second reference refers to a second time slot in the time-divided channel, in which second time slot access requests were received in the base station from the respective mobile station for which the access confirmations are intended.

4. A method according to claim 3, wherein:

the second reference is made up of the number of time slots between the first time slot and the second time slot.

5. In a radio communication system which is arranged for packet data transmission, via at least one time-divided channel, between a base station and mobile stations, according to a message-synchronized ALOHA protocol with reservation, a method comprising the following steps:

receiving access requests from the mobile stations;

complying with the access request from at least a first mobile station by sending a channel reservation thereto, whereby time slots are reserved for packet data transmission between the first mobile station and the base station;

giving access confirmations to each mobile station in a first group of mobile stations on receipt of access requests from the first group of mobile stations for which channel reservation momentarily cannot be carried out;

sending these access confirmations in the same message as the channel reservation for the first mobile station;

arranging, in association with the access confirmations, in the radio communication system a queue of the mobile stations in the first group, a queue position being allocated to each mobile station; and carrying out channel reservation for the mobile stations according to their queue positions.

6. In a radio communication system, which is arranged for packet data transmission via at least one time-divided channel between a base station and mobile stations, according to a message-synchronized ALOHA protocol with reservation, the mobile station (MS1–MS3) being arranged to send access requests to the base station, the base station comprising:

means for receiving and complying with access requests from at least a first mobile station by sending thereto a channel reservation message comprising a channel reservation, whereby a number of time slots are reserved for packet data transmission between the first mobile station and the base station;

means for receiving access requests from a first group of mobile stations for which channel reservation momentarily cannot be carried out;

means for giving access confirmations to each of the mobile stations which are included in the first group and from which access requests have been received;

means for including said access confirmations in the same channel reservation message as said channel reservation for the first mobile station;

means for arranging a queue of the mobile stations in the first group, a queue position being allocated to each mobile station; and means for carrying out channel reservation for the mobile stations in the first group according to their queue positions.

7. In a radio communication system, which is arranged for packet data transmission via at least one time-divided channel between a base station and mobile stations, a mobile station comprising:

means for sending an access request to the base station;

means for reading each channel reservation message in the time-divided channel; and means for receiving an access confirmation in said channel reservation message when the channel reservation does not concern this mobile station, whereupon the mobile station is actuated to await channel reservation without further access requests being sent.

*8. A method for a mobile station to communicate with a base station in a radio communication system, comprising the steps of:*

*sending an access request from the mobile station to the base station;*

*monitoring, by the requesting mobile station, for a response to the access request from the base station;*

*receiving as the response, by the requesting mobile station, an access confirmation that does not include a channel reservation for the requesting mobile station; and*

*in response to receiving the access confirmation, suppressing further access requests by the requesting mobile station while awaiting the channel reservation from the base station.*

*9. A mobile station comprising:*

*means for sending an access request to a base station;*

*means for monitoring, by the mobile station, for a response to the access request from the base station; and*

*means for receiving as the response, by the mobile station, an access confirmation that does not include a channel reservation for the mobile station, whereupon the mobile station is adapted to await the channel reservation without sending further access requests to the base station.*

*10. A method for a base station to assign a communication channel to a mobile station in a radio communication system, comprising the steps of:*

*receiving an access request from said mobile station;*

*determining whether a communication channel is available for the requesting mobile station;*

*upon determining that a communication channel is available, transmitting a channel reservation to the requesting mobile station; and*

*upon determining that a communication channel is not available:*

*transmitting to the requesting mobile station, an access confirmation that does not include a channel reservation for the requesting mobile station, whereupon the requesting mobile station awaits the channel reservation without transmitting subsequent access requests; and*

*transmitting the channel reservation to the requesting mobile station when a communication channel becomes available.*

*11. A base station in a radio communication system, comprising:*

*means for receiving an access request from a mobile station;*

*means for determining whether a communication channel is available for the requesting mobile station;*

*means, responsive to a determination that a communication channel is available, for transmitting to the requesting mobile station, a channel reservation; and*

*means, responsive to a determination that a communication channel is not available, for transmitting to the requesting mobile station, an access confirmation that does not include a channel reservation for the requesting mobile station, whereupon the requesting mobile station awaits the channel reservation without transmitting subsequent access requests.*

*12. In a radio communication system which is arranged for packet data transmission via at least one time-divided channel between a base station and mobile stations, according to a message-synchronized ALOHA protocol with reservation, the mobile stations being arranged to send access requests to the base station, which is arranged to receive and comply with access requests from at least a first mobile station by sending thereto a channel reservation message comprising a channel reservation, whereby time slots are reserved for packet data transmission between the first mobile station and the base station, and to receive access requests from a first group of mobile stations for which channel reservation momentarily cannot be carried out, a method comprising the steps of:*

*scheduling the transmission of an access request, the scheduling by a first mobile station timed to reduce simultaneous access requests from a plurality of mobile stations, the access request comprising the first mobile station's desired resources;*

*confirming the reception of the access request from the first mobile station in the form of a channel reservation;*

*confirming the reception of access requests from the first group of mobile stations in the form of an access confirmation from the base station to each of the mobile stations included in the first group, wherein the access confirmation is in the channel reservation to the first mobile station;*

*queuing the first group in the radio communication system associated with the access confirmations, a queue position being allocated to each of the mobile stations in this group;*

*idling the first group of mobile stations, the idling responsive to the queuing; and*

*carrying out channel reservation for the mobile stations according to their queue positions.*

*13. The method of claim 12, wherein the first group of mobile stations remains idle for a predetermined timed duration.*

*14. The method of claim 12, wherein the first group of mobile stations remains idle until a prompt is received by the base station.*

*15. In a radio communication system, which is arranged for packet data transmission via at least one time-divided channel between a base station and mobile stations, a mobile station comprising:*

*means for sending an access request to the base station, the access request scheduled to reduce simultaneous access requests from a plurality of mobile stations, the access request comprising the first mobile station's desired resources;*

*means for monitoring for a transmission from the base station; and*

*means for receiving an access confirmation from the base station, wherein the access confirmation idles the mobile station to await channel reservation without further access requests being sent.*

* * * * *

UNITED STATES PATENT AND TRADEMARK OFFICE

CERTIFICATE OF CORRECTION

PATENT NO. : RE 40,896 E
APPLICATION NO. : 10/208767
DATED : September 1, 2009
INVENTOR(S) : Turina et al.

It is certified that error appears in the above-identified patent and that said Letters Patent is hereby corrected as shown below:

In Column 4, Line 26, delete "stations" and insert -- station --, therefor.

In Column 4, Line 48, delete "confirmation" and insert -- confirmations --, therefor.

In Column 6, Lines 28-31, in Claim 6, after "mobile stations," delete "according to a message-synchronized ALOHA protocol with reservation, the mobile station (MS1–MS3) being arranged to send access requests to the base station".

Signed and Sealed this

Nineteenth Day of January, 2010

David J. Kappos

David J. Kappos
*Director of the United States Patent and Trademark Office*